United States Patent
Franet et al.

(10) Patent No.: US 6,401,440 B1
(45) Date of Patent: Jun. 11, 2002

(54) SELF-PROPELLED MOWING VEHICLE AND CONVEYOR ARRANGEMENT FOR COMBINING SWATHS OF CUT CROP

(75) Inventors: Roger Franet, Sarreguemines; Larry Neil Smith, Gray, both of (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/605,177

(22) Filed: Jun. 28, 2000

(30) Foreign Application Priority Data

Jul. 10, 1999 (DE) .......................................... 199 32 285

(51) Int. Cl.$^7$ ............................................... A01D 61/00
(52) U.S. Cl. ........................................... 56/16.6; 56/203
(58) Field of Search ............................. 171/14; 56/16.5, 56/203, 227.1, 327.2, 194, 27.5, 202, 6, 7, 16.7, 16.6

(56) References Cited

U.S. PATENT DOCUMENTS

| | | | | |
|---|---|---|---|---|
| 2,343,583 A | * | 3/1944 | Rogers ........................ | 56/345 |
| 3,473,613 A | * | 10/1969 | Boyce ......................... | 171/14 |
| 3,695,014 A | * | 10/1972 | Alphin et al. ................ | 56/27.5 |
| 3,717,981 A | * | 2/1973 | Van Der Lely ................. | 56/6 |
| 3,742,691 A | * | 7/1973 | Graybill ...................... | 56/259 |
| 3,986,561 A | * | 10/1976 | Bettencourt et al. .......... | 171/14 |
| 4,021,996 A | * | 5/1977 | Bartlett et al. ............... | 56/7 |
| 4,147,017 A | * | 4/1979 | Cortopassi et al. .......... | 56/16.5 |
| 4,377,930 A | * | 3/1983 | Halls et al. .................. | 56/221 |
| 4,392,533 A | * | 7/1983 | Bittle ......................... | 171/14 |
| 4,560,008 A | * | 12/1985 | Carruthers ................... | 171/14 |
| 4,777,786 A | * | 10/1988 | Arnold ........................ | 56/199 |
| 4,846,198 A | * | 7/1989 | Carnewal et al. ............. | 460/21 |
| 4,907,402 A | * | 3/1990 | Pakosh ........................ | 56/14.6 |
| RE34,921 E | * | 5/1995 | Lamusga et al. ................ | 56/7 |
| 5,974,774 A | * | 11/1999 | Peachey ....................... | 56/365 |

FOREIGN PATENT DOCUMENTS

| | | | | |
|---|---|---|---|---|
| DE | 132 750 | | 11/1978 | |
| DE | 297 19 765 U1 | | 2/1999 | |
| GB | 2077562 | * | 12/1981 | .......... A01D/84/00 |

* cited by examiner

Primary Examiner—Robert E. Pezzuto
Assistant Examiner—Árpád Fábián Kovács

(57) ABSTRACT

A self-propelled mowing vehicle includes a chassis supported on front and rear pairs of transversely spaced wheels. At least a front-mounted mowing unit is attached to a front end of the chassis and operates to deliver cut crop to a longitudinally extending first section of a flat belt conveyor assembly which includes at least a second section that receives crop from the first section and delivers it transversely. In accordance with a first embodiment, the first conveyor section terminates at the rear sides of the front pair of wheels and the second conveyor section extends perpendicular to a longitudinal centerline of the vehicle and is mounted for sliding movement so as to selectively deliver crop to either side of the vehicle. In accordance with another embodiment the first conveyor section extends to the rear end of the vehicle and the second conveyor section is mounted for pivoting about an upright axis so as to selectively deliver crop to opposite sides of the vehicle or to strew the crop across its full range of movement. In accordance with still another embodiment, the conveyor arrangement includes second and third fixed conveyor sections located transversely to and on opposite sides of the vehicle centerline, with the first conveyor section being divided so as to divide the transported crop into two streams which are respectively deposited onto the second and third conveyor sections. Opposite side mowing units may be used with the front-mounted unit and when so used the second conveyor section operates to lay crop closely beside windrows formed by the first conveyor section so that the double windrows may be gathered by a wide pickup of a machine for further processing the crop.

11 Claims, 4 Drawing Sheets

SELF-PROPELLED MOWING VEHICLE AND CONVEYOR ARRANGEMENT FOR COMBINING SWATHS OF CUT CROP

The invention concerns a self-propelled mowing vehicle with at least one mowing unit arranged at the front in the direction of operation, that delivers mowed crop to an outlet where it falls to the ground to form a swath or windrow.

BACKGROUND OF THE INVENTION

DE-U-297 19 765 discloses a self-propelled mowing vehicle having a forward mowing unit and a mowing unit on each side. The front mowing unit delivers mowed crop to a conditioning arrangement which deposits the crop in one swath between the wheels of the mowing vehicle. The mowing units at the sides of the vehicle similarly deliver mowed crop so as to form respective swaths at the opposite sides of the vehicle.

The problem underlying the invention is seen in the fact that the size of the swath of the central, front mowing unit is limited in width by the spacing between the wheels and is limited in height by the ground clearance between the lowest axle, and this size remains fixed. A grouping of several swaths must always be directed by the central swath, which can also result in the need for one or more swaths to be moved on the ground by means of a rake. This raking operation may result in stones and/or dirt to be mixed in with the swath or windrow, which of course, is undesirable.

SUMMARY OF THE INVENTION

According to the present invention there is provided a self-propelled mowing machine, of the type including a front-mounted mowing unit, which is designed to overcome the drawbacks of the prior art devices.

An object of the invention is to provide a self-propelled mower equipped with a front mowing unit and opposite side units, the front unit delivering mowed crop to a conveying arrangement that deposits the mowed crop to one side so as to be alongside or joined with a second swath that is deposited by one of the opposite side units.

A more specific object of the invention is to provide a self-propelled mower, as defined in the immediately preceding object, wherein the conveyor arrangement includes a first conveyor that extends longitudinally beneath the vehicle and a second conveyor that receives mowed crop from the first conveyor and delivers it either to one or the other sides of the vehicle, or optionally to either side of the vehicle.

Still a more specific object of the invention is to provide a self-propelled mower, as defined in one of the previous objects, wherein the first conveyor terminates at a rearward location between front and rear sets of wheels of the vehicle and wherein the second conveyor extends to one side of the vehicle to a location outside the wheels located on that one side.

Yet another specific object of the invention is to provide a self-propelled mower as set forth in one or more of the previous objects, wherein the first conveyor terminates at a rearward location between front and rear sets of wheels of the vehicle and the second conveyor extending to both sides of the vehicle and being selectively reversible so as to optionally deliver crop to the opposite sides of the vehicle.

Still another specific object of the invention is to provide a self-propelled mower, as set forth in the second object stated above, wherein the first conveyor extends longitudinally beneath, and to the rear end of, the vehicle and wherein said second conveyor is pivotally mounted at the rear end of the first conveyor for being selectively pivoted to either side of the vehicle so as to deliver crop there.

These and other objects of the invention will become apparent from a reading of the ensuing description together with the appended drawings.

DESCRIPTION OF THE PREFERRED EMBODIMENTS

Figure 1:
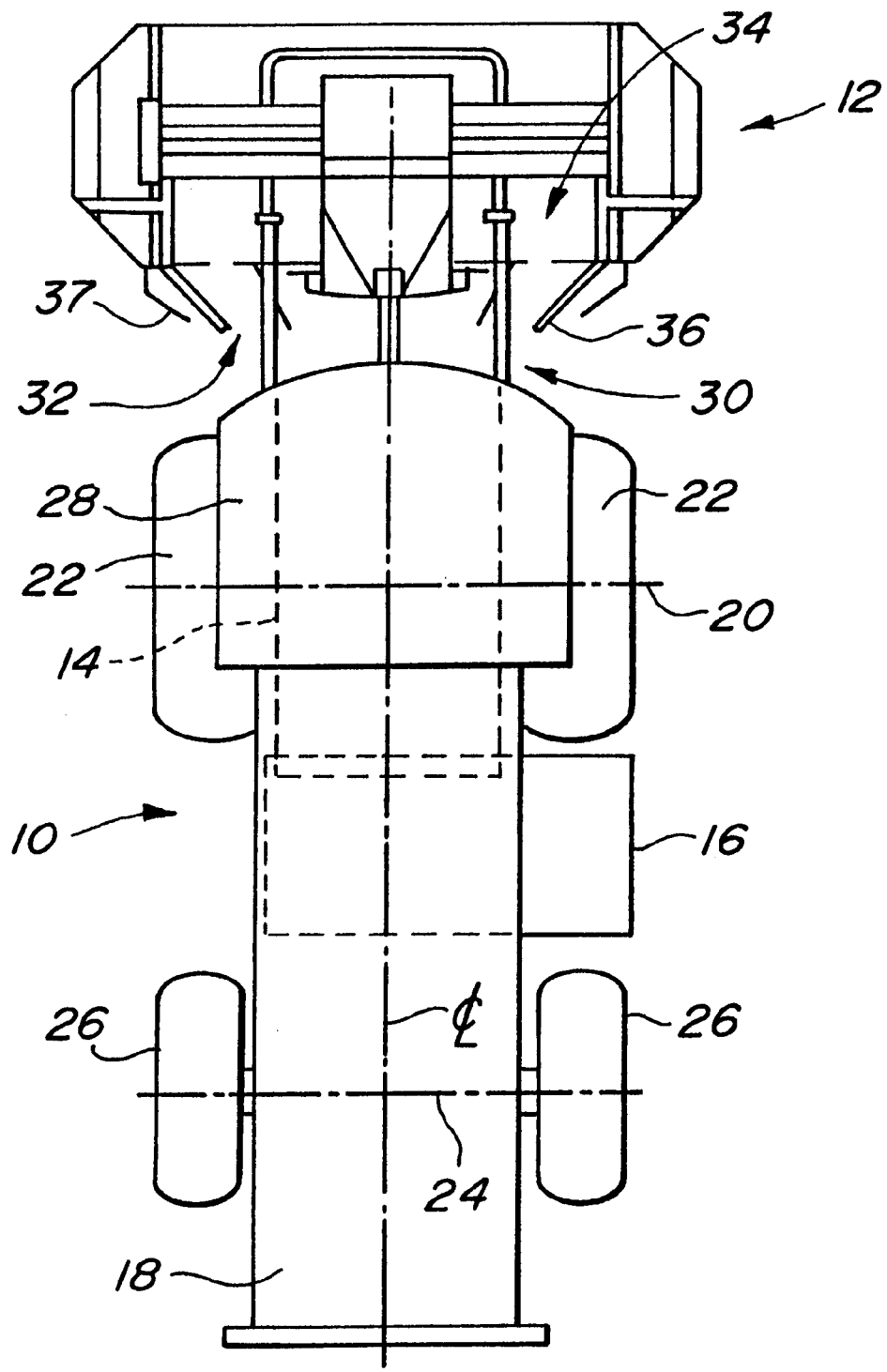
FIG. 1 is a top plan view of a self-propelled mowing vehicle with a front-mounted mowing unit and a first and a second conveyor arranged according to a first embodiment.

Referring now to FIG. 1, there is shown a mowing vehicle 10, a front-mounted mowing unit 12, a first conveyor 14 and a second conveyor 16. Specifically, the mowing vehicle 10 is basically a self-propelled chopper vehicle without the otherwise usual front attachment for taking up corn or grass and without the usual discharge spout for conveying chopped crop to a trailing container for transport. The mowing vehicle 10 includes a chassis 18 supported on the ground by driven front wheels 22 mounted for rotation on an axles (not shown) positioned along the axis 20, and by steerable rear wheels 26 mounted for rotation on an axle (not shown) located along an axis 24. An operator's cab 28 is mounted on a forward end section of the chassis 18. Provided on the front end of the chassis 18 is an implement three-point hitch 30 that can be repositioned in height by means of a lifting device, not shown.

The mowing unit 12 is essentially a conventional disk mower with several mowing disks, not shown, arranged alongside each other on a mowing beam or cutterbar, that can cover a total mower width up to 5 m. The mowing unit 12 is configured as a so-called front mower and is equipped on its side facing the mowing vehicle 10 with an implement coupling 32 which is connected with the implement three-point hitch 30. On the rear side facing the mowing vehicle 10, a crop processing arrangement 34, including right-and left-hand swath vanes 36 and 37, is provided. The mowing unit 12 conducts the mowed crop, usually grass, to the rear in a stream that would fit in the region between the wheels 22 or 26 and in height between the underside of the mowing vehicle 10 and the ground.

The crop processing arrangement 34, which is a crop conditioner, is not necessary for the application of the mowing unit, but is advantageous for certain crops and crop conditions. The processing arrangement 34 is of a type which includes a rotor, not shown, operating as an overshot conveyor and equipped with tines, which takes the mowed crop from the mowing beam, processes it and conducts it further to the rear to the mowing vehicle 10. The operating width of the mowing unit 12 is greater than the mowing vehicle 10 itself. The swath vanes 36 and 37 are used to guide the stream of the crop from the sides to a narrower stream behind the crop processing arrangement 34. In case there is no crop processing arrangement 34, the swath vanes 36 and 37 are arranged or configured in such a way that they catch the mowed crop directly from the mowing beam and guide it to a narrower stream. The crop cut by the mowing unit 12 is deposited on the ground after being cut and dries there until it is taken up and further processed by a self-loading forage box, a baler or a forage harvester.

Figure 4:
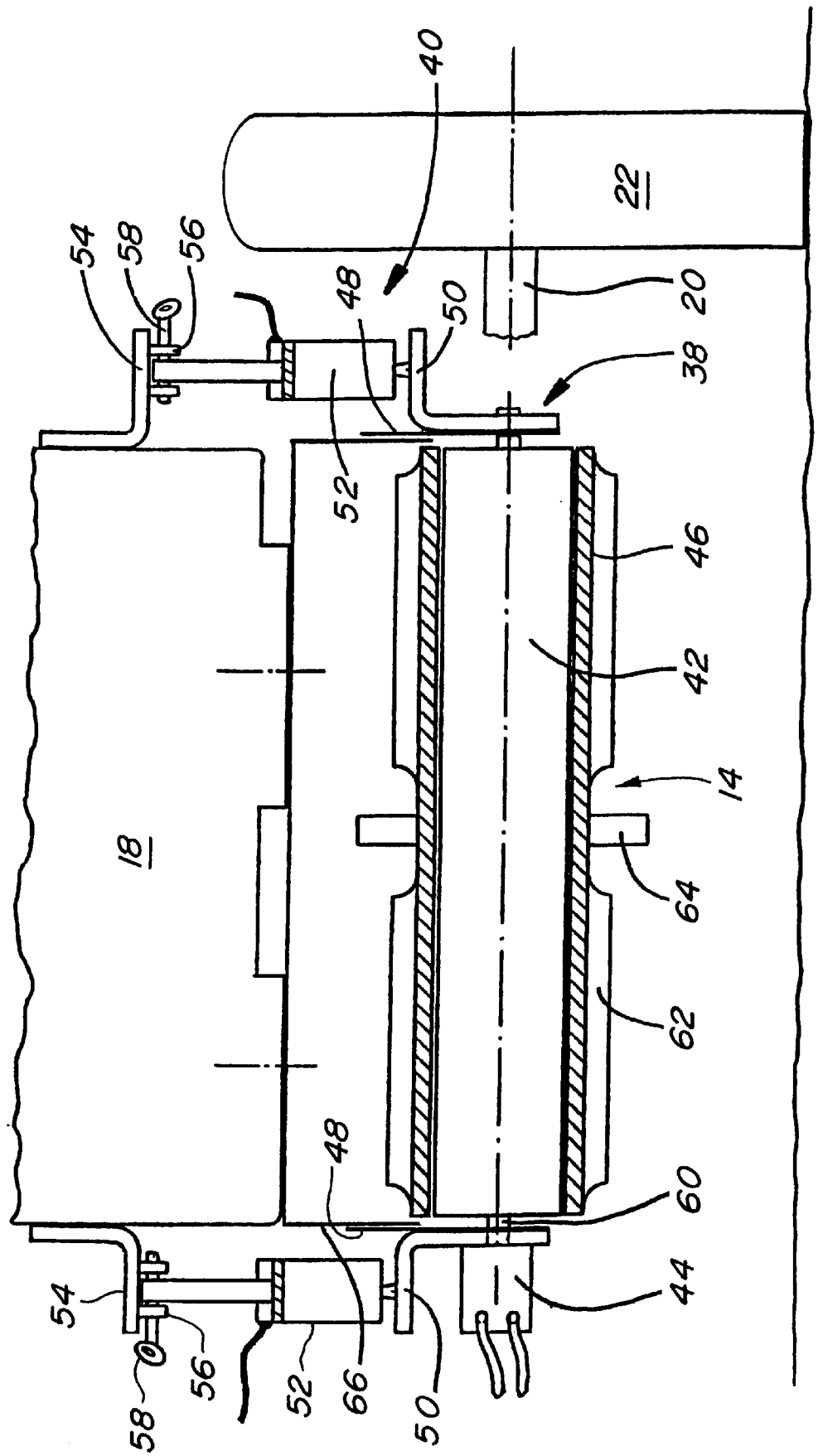
FIG. 4 is a vertical sectional view taken through the first conveyor along line 4—4 of FIG. 3.

The first conveyor 14 is configured as a plane or flat conveyor of the class of belt conveyors and can be seen in FIG. 4 in detail and in section. According to the schematic illustration of FIG. 1, the first conveyor 14 extends from the output region of the crop processing arrangement 34 between the front wheels 22 and underneath the axle axis 20 up to the beginning of the region between the front and rear wheels 22 and 26, respectively. The width of the conveyor occupies nearly the entire space between the front wheels 22.

As can be seen in FIG. 4, the first conveyor 14 contains a frame 38, a connecting device 40, several rolls 42, a motor 44 and a conveyor belt 46.

The frame 38 contains sheet metal cheeks 48, that are connected to each other by struts, not shown, and thereby form a rigid unit. The sheet metal cheeks 48 extend over the entire length of the conveyor 14 and rise above the conveyor belt 46 so that they guide the mowed crop at its sides and prevent it from falling off. Retainers 50 are attached preferably to four locations of the sheet metal cheeks 48 in particular or to the frame 38 in general, which in this embodiment are configured as angles pointing outward.

The connecting device 40 includes a positioning device 52 and a bracket 54, in particular in the region of each retainer 50. Preferably a positioning device 52 and a bracket 54 are provided in each corner region of the frame 38 so that the frame 38 and therewith the entire first conveyor 14 can be repositioned in height with respect to the ground.

In the preferred embodiment, the positioning device 52 is configured as a hydraulic double-acting servo motor, whose length can be changed from the operator's cab 28. In a simplified form, each positioning device 52 could be a chain, a rope or the like, coupled between each retainer 50 and bracket 54.

Each bracket 54 is shown in simplified form as an angle that is attached to the chassis 18 and is provided on its underside with a clevis 56, to which the positioning device 52 is secured by a pin 58. The brackets 54 correspond in their number and location to those of the positioning devices 52. From all that, it can be seen that the frame 38 can be repositioned as a complete unit between the underside of the chassis 18 and the ground.

The rolls 42 are made of steel or plastic and supported in bearings at the sides, free to rotate, in the frame 38. The rolls 42 extend essentially over the entire region between the sheet metal cheeks 48 and thereby carry the conveyor belt 46 over its entire width. At least one of the end rolls 42 is supported in bearings in such a way that the distance to the opposite end roll 42 can be changed and thereby the tension of the conveyor belt 46 can be maintained at all times at the required value.

The motor 44 is connected through a stub shaft 60 with one of the rolls 42, on which the conveyor belt 46 is in contact under tension. the drive shown here as a hydraulic motor 44 is shown as representative of any other possible type of drive, that is a mechanical drive with shaft or tensioning means or even an electric drive. The motor 44 is attached in a flange at the retainer 50 located toward it. The control of the direction of rotation, the power and the speed of the motor 44 is performed from a position, not shown, in the operator's cab 28.

The conveyor belt 46 is formed from rubber or the like with inserts and is either continuous or connected at its ends with a joint. The conveyor belt 46 shown includes a preferred further development in the form of conveying elements 62. These conveying elements 62 are configured as rails, cams, ribs or cleats extending transverse to the direction of conveying and engage in a positive lock of sorts with the crop conveyed.

In addition, FIG. 4 shows that the conveyor belt 46 carries dividing elements 64 that extend in the direction of conveying and are located approximately in the center of the conveyor belt 46. These dividing elements 64 are either ribs or fingers separated from each other and standing on edge or they are configured as an undulating, continuous wall, which permits the conveyor belt 46 to bend around the rolls 42. By means of the dividing elements 64, the crop lying on the surface of the conveyor belt is divided into two steams of crop. The use of such dividing elements 64 is intended for the embodiment in FIG. 3.

Mounted on the underside of the chassis 18 above the first conveyor 14 and extending over the entire length of the conveyor 14 is a smooth plate 66 that prevents the mowed crop from adhering to the underside of the chassis 18 and causing jams. This smooth plate 66 is constructed from sheet metal or plastic plate in the form of an inverted "U", where the side legs extend within the channel bordered by the sheet metal cheeks 48, so that the conveyor 14 can be lifted past the legs of the plate 66. It can be seen that the sheet metal cheeks 48, the upper side of the conveyor belt 46 and the plate 66 define a channel within which the mowed crop can be conveyed without appreciable friction. Although not shown, the plate 66 and the conveyor 14 may be arranged at a greater distance from each other in the intake region immediately downstream of the crop processing arrangement 34, than in the transition region to the second conveyor 16, with the result that the crop is accepted without any problem and is compressed in a wedge-shaped region.

The second conveyor 16 is generally configured as is the first conveyor 14. The arrangement of the two conveyors 14 and 16 to each other is selected in such a way that the conveying surface of the second conveyor 16, which is located downstream, in any case is as high as that of the first conveyor 14. However, the second conveyor 16 is preferably located slightly below the first conveyor 14, as can also be seen in FIG. 1. In contrast to the conveyor belt 46 of the first conveyor 14, the conveyor belt 46 of the second conveyor 16 is not provided with any dividing elements 64, since there is no need for dividing the streams of crop at that location.

According to an alternative embodiment, not shown, a sliding device, not shown in any further detail, is located between the frame 38 of the second conveyor 16 and the associated connecting device 40, with which it is possible to shift the frame 38 with the conveyor belt 46 transverse to the direction of operation. The shifting movement can be performed by means of a hydraulic servo motor, not shown, which engages on the one hand the frame 38 and on the other hand the sliding device. With such an embodiment, it is possible to shift the second conveyor 16 from its position shown in FIG. 1, in which the mowed crop is delivered on the right side of the mowing vehicle 10, into a location that is a mirror image, in which the mowed crop is delivered on the left side of the mowing vehicle 10. As can be seen in particular in FIG. 1, the second conveyor 16 essentially occupies the entire region between the front and the rear wheels 22 and 26. In a way, also not shown, a curved guide vane can be provided in the transition region from the first conveyor 14 to the second conveyor 16, which assures a guidance deflection of the mowed crop through 90° without any problems.

The operation of the embodiment illustrated in FIG. 1 is now stated. Standing crop is separated from the ground by the mowing unit 12, processed in the crop processing arrangement 34 and guided by the swath vanes 36 and 37 to the first conveyor 14. The conveyor belt 46 of the first conveyor 14 accepts the harvested crop directly and guides it above the ground, through the region between the front wheels 22, and beneath the vehicle chassis 18 and the plate 66, if available, to the second conveyor 16. The second conveyor 16 accepts the mowed crop and delivers it through the free space between the front and rear wheels 22 and 26 to the side of the mowing vehicle 10.

Figure 2:
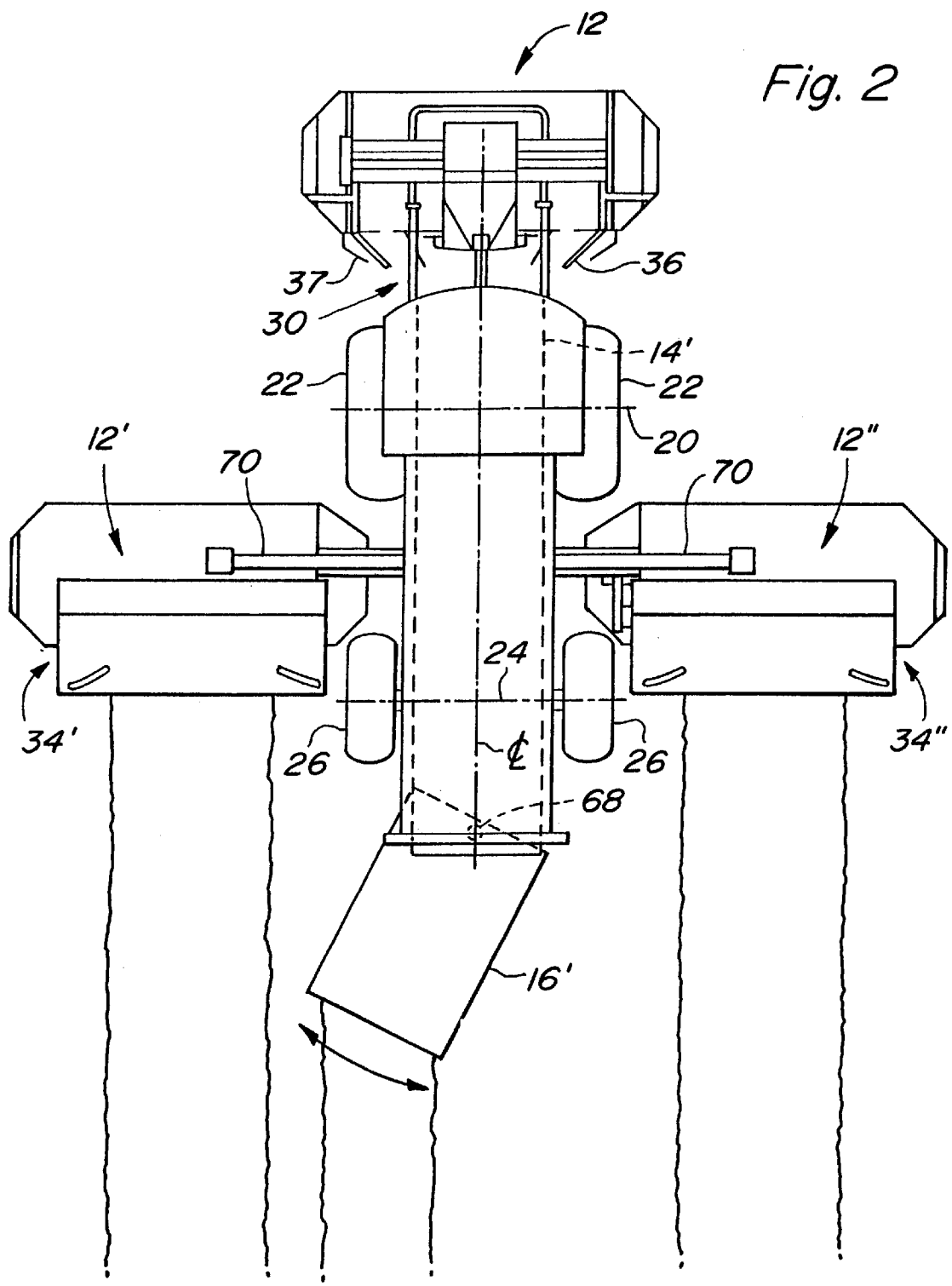
FIG. 2 is a top plan view of a self-propelled mowing vehicle equipped with a front and opposite side mowing units together with first and second conveyors arranged according to a second embodiment.

In the embodiment according to FIG. 2, a first conveyor 14' extends over the entire length of the mowing vehicle 10 and thereby ends in the region of its rear end. The configuration of the first conveyor 14, in particular with its frame 38, connecting device 40, rolls 42 and conveyor belt 46 is similar to, but merely longer than that, described in connection with the embodiment according to FIG. 1. A second conveyor 16' is also configured like the second conveyor 16 illustrated in FIG. 1. However, it is not attached rigidly or so as to be shifted sideways, but rather so that it can be pivoted horizontally. The pivoting movement is performed about a vertical or approximately vertical pivot axis 68 and is controlled by means of a hydraulic or electric motor, not shown. The movement of the second conveyor 16' can occur in various ways. According to one way, the second conveyor 16' is pivoted only to the left or only to the right, in order to deposit a swath of crop to the side of the mowing vehicle 10. According to another way, the second conveyor 16' can be moved constantly and relatively rapidly from left to right and thereby deposit the stream of crop on the ground in a thin layer behind the mowing vehicle 10, particularly in a width that exceeds the width of the mowing vehicle 10.

A further difference between the embodiments according to FIGS. 1 and 2 lies in the application of two further mowing units 12' and 12" that are connected to the chassis 18 by means of vertically pivoted arms 70 in the region between the front and rear wheels 22 and 26. Each mowing units 12' and 12" are respectively equipped with crop processing arrangements 34' and 34" the deposit the mowed crop in a swath on the ground. The second conveyor 16' is arranged in such a way that it deposits the mowed crop accepted by the central, forward mowing unit 12 and conducted further by the first conveyor 14' immediately alongside the swath of the left mowing unit 12' and thereby forms a double swath while the swath of the right mowing unit 12" remains alone.

If during the following mowing operation, the mowing vehicle 10 mows in the opposite direction along the edge of the cut of the right mowing unit 12", then the single swath formed by the right mowing unit 12" is deposited alongside the single swath previously deposited and thereby also forms a double swath.

If during the following mowing operation, the mowing is performed in the same direction, that is, the operation continuously circulates about the section to be mowed, then the swath of the mowing unit 12' is deposited alongside the previously deposited swath of the mowing unit 12" from the previous mowing operation. the second conveyor 16' is pivoted to the right and now deposits the swath of the central mowing unit 12 alongside the swath of the right mowing unit 12". In this way, double swaths are constantly formed which can be taken up by a correspondingly wide pick-up.

Alternatively, the swaths of the mowing units 12' and 12" could also be deposited towards the longitudinal centerline of the mowing vehicle 10 and the central swath could be deposited or spread behind the central mowing unit 12.

For the sake of completeness, it should be noted that the embodiment according to FIG. 2 does not require the additional mowing units 12' and 12".

Figure 3:
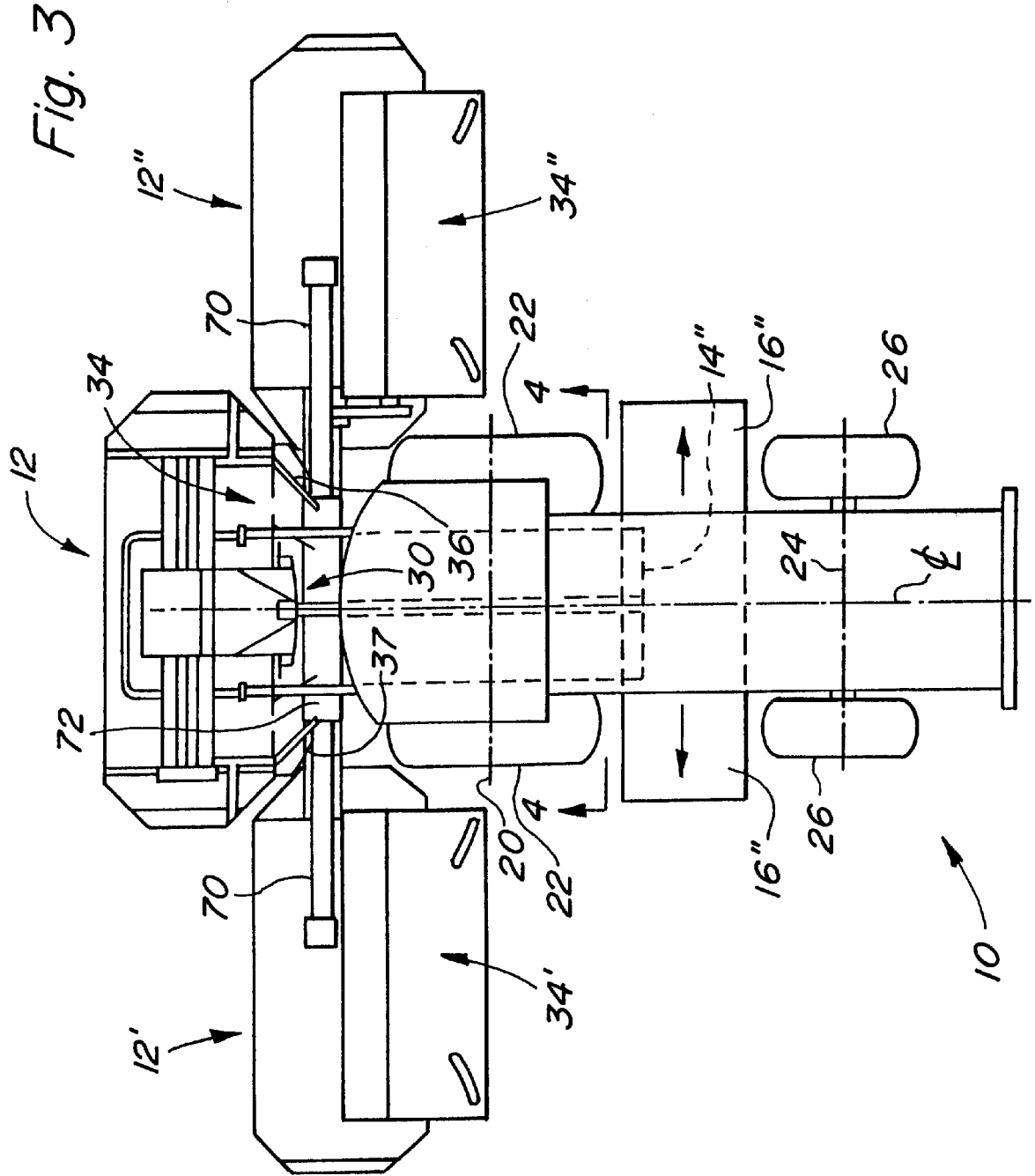
FIG. 3 is a top plan view of a self-propelled mowing vehicle equipped with front and opposite side mowing units, arranged slightly different than those of FIG. 2, together with first and second conveyors arranged according to a third embodiment.

FIG. 3 shows a mowing vehicle 10 with a central, forward mowing unit 12, as is already the case for the embodiments according to FIGS. 1 and 2. Furthermore, a left and a right mowing unit 12' and 12" is again provided, however, in this embodiment they are located in partial fore-and-aft overlapping relationship to the processing arrangement 34 of the central mowing unit 12. In this case, all mowing units 12, 12' and 12" are attached to a common frame 72 which is carried by the three-point implement hitch 30. The side mowing units 12' and 12" are attached to the frame 72 by means of the arms 70. Each of the mowing units 12, 12' and 12" is provided with a crop processing arrangement 34, 34' and 34". It applies here again that the side mowing units 12' and 12" are not required for this embodiment, but are only advantageous. In the embodiment according to FIG. 3, one first conveyor 14" and two second conveyors 16" are provided.

The first conveyor 14" again extends underneath the mowing vehicle 10 from the central mowing unit 12 to the rear edge of the front wheels 22, as was already the case with the embodiment according to FIG. 1. The configuration and the drive of the first conveyor 14" corresponds to the previously described first conveyor 14, but here the conveyor is provided with dividing elements 64, as shown in FIG. 4, that have the effect of dividing the crop stream in half in the direction of conveying.

The two second conveyors 16" also correspond generally in configuration, and in the way they are driven, to the previously described conveyors 14 or 14' and 16 or 16'. However, they are shorter and extend only from the longitudinal centerline of the mowing vehicle 10 to the region outboard of the front and rear sets of wheels 22 and 26. In this way, the same amount of mowed crop is deposited on both sides of the mowing vehicle 10 alongside an already existing swath or a swath still to be formed. This process of delivering mowed crop to the side has an advantage even when no side mowing units 12' and 12" are present, since it then is possible to deposit the swath thinner and wider so that it dries more rapidly. The short configuration of the second conveyors 16" also makes it possible to modify their mounting so that they may respectively pivot into a non-operating positions about an axis oriented in the direction of operation.

What is claimed is:

1. A combined self-propelled mowing vehicle and conveyor arrangement, comprising: said vehicle including a chassis supported on front and rear pairs of transversely spaced wheels; a mowing arrangement including a front-mounted mowing unit coupled to a front end of said chassis ahead of said front pair of transversely spaced wheels, and right- and left-hand mowing units respectively mounted to opposite sides of said chassis at respective locations rearward of said front-mounted mowing unit and having respective swath-forming elements located for creating right- and left-hand swaths of cut crop material located outside said front and rear pairs of wheels; said conveyor arrangement including a first conveyor section mounted so as to extend beneath said chassis and along a longitudinal centerline of said vehicle between said front pair of transversely spaced wheels and having a forward end located ahead of said front pair of transversely spaced wheels for intercepting cut crop delivered by said front-mounted mowing unit, and a rear end located at least as far to the rear in the vehicle as are said right- and left-hand mowing units; and at least a second conveyor section located adjacent said rear end of said first conveyor section, for receiving crop delivered by said first conveyor section, and having a discharge end disposed to one side of said longitudinal centerline for depositing cut crop outside a first one of each of said front and rear pairs of wheels so as to be alongside a corresponding first one of said right-and left-hand swaths of crop material.

2. The combination set forth in claim 1 wherein said right- and left-hand mowing units are mounted to the front of said chassis and said rear end of said first conveyor section being located proximate a rear side of said front pair of transversely spaced wheels.

3. The combination set forth in claim 2 wherein said second conveyor section is disposed perpendicular to said longitudinal centerline.

4. The combination set forth in claim 3 wherein said conveyor arrangement includes a third conveyor section disposed in alignment with said second conveyor arrangement and has a discharge end located for depositing crop outside a second one of said rear pair of transversely spaced wheels.

5. The combination set forth in claim 4 wherein said first conveyor section includes a flat conveyor belt to which is attached dividing elements located along said longitudinal centerline so as to cause crop carried by said conveyor belt to be divided into first and second streams on opposite sides of said dividing elements; and said second and third conveyor sections being respectively disposed for receiving said first and second streams of crop.

6. The combination set forth in claim 1 wherein said first conveyor section has a discharge end located proximate a rear side of said rear pair of transversely spaced wheels.

7. The combination set forth in claim 6 wherein said second conveyor section is mounted for pivoting about an upright axis for permitting said discharge end to be swung to opposite sides of said longitudinal centerline.

8. The combination set forth in claim 1 wherein said right- and left-hand mowing units are mounted to said chassis at respective locations on opposite sides of said chassis between said front and rear pairs of wheels; and said first conveyor section extending beneath said chassis to a location rearward of said rear pair of wheels.

9. The combination set forth in claim 1 wherein said mowing arrangement includes a mower unit support frame mounted to a front location of said chassis so as to be forward of said pair of front wheels; said front-mounted mowing unit being coupled to said support frame; and said right- and left-hand mowing units being respectively mounted to opposite sides of said mower unit support frame.

10. The combination set forth in claim 1, and further including a vertically adjustable attaching arrangement connected between said first conveyor section and said chassis for permitting said first conveyor section to be adjusted vertically relative to said chassis.

11. The combination set forth in claim 10 wherein said first conveyor section is a flat belt conveyor; said attaching arrangement includes a first bracket arrangement including at least four brackets located two each at opposite sides thereof; said chassis being provided with a second bracket arrangement including four brackets respectively located two each at opposite sides of said chassis substantially vertically above said brackets of said first bracket arrangement so as to define four cooperating pairs of brackets; and an extensible and retractable actuator being mounted between each pair of cooperating brackets so as to support said first conveyor section from said chassis, whereby the first conveyor section is vertically adjustable relative to said chassis upon actuation of the extensible and retractable actuators.

* * * * *